May 9, 1939.  H. S. JANDUS  2,157,825
BUMPER STRUCTURE
Filed Dec. 17, 1937   2 Sheets-Sheet 1
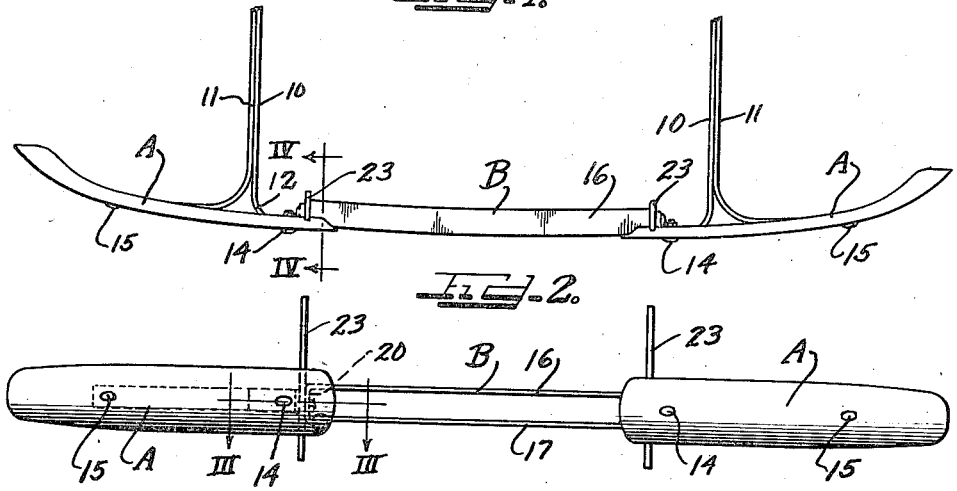
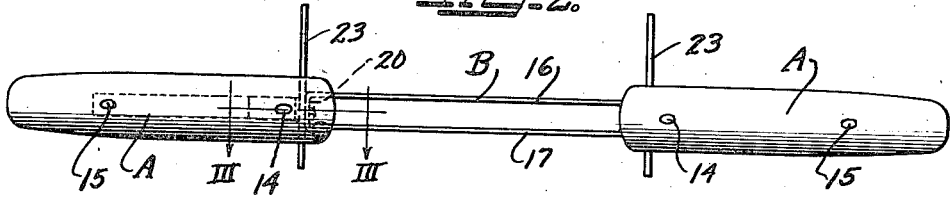
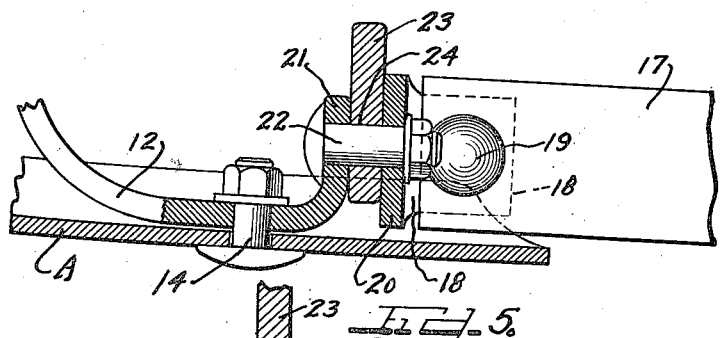
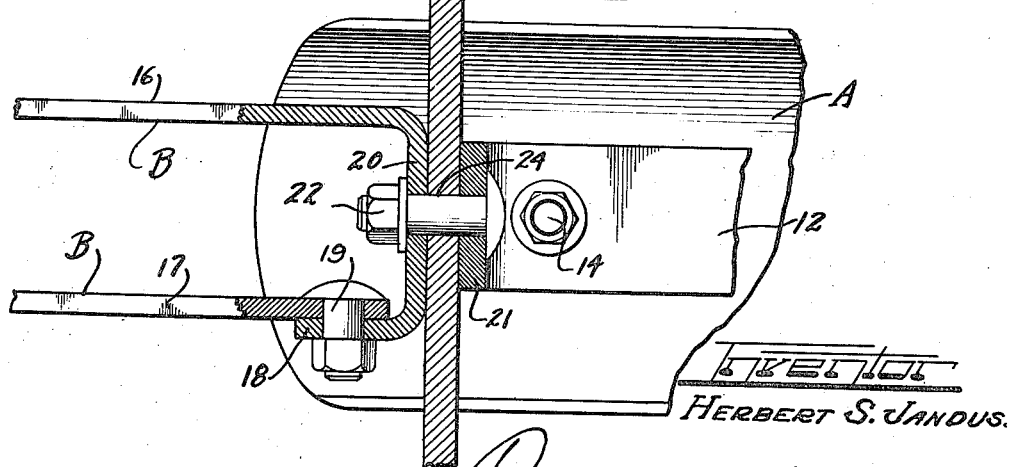
Inventor
HERBERT S. JANDUS
by Charles O'Neill Attys.

May 9, 1939.  H. S. JANDUS  2,157,825
BUMPER STRUCTURE
Filed Dec. 17, 1937  2 Sheets-Sheet 2
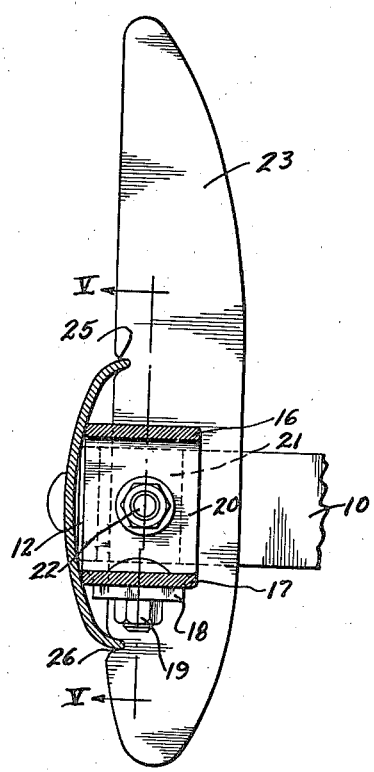
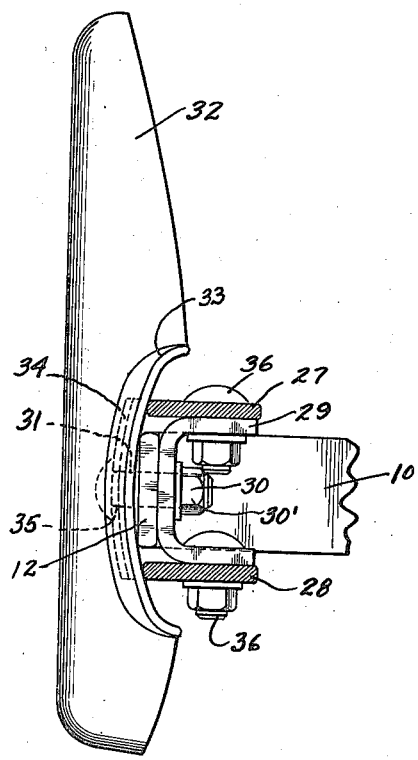
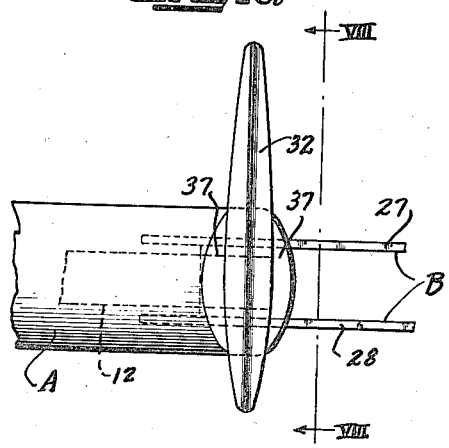
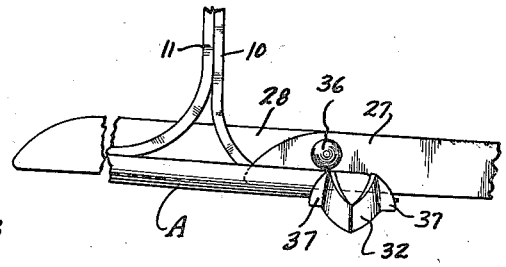
Inventor
HERBERT S. JANDUS.

Patented May 9, 1939

2,157,825

UNITED STATES PATENT OFFICE 2,157,825

BUMPER STRUCTURE

Herbert S. Jandus, Detroit, Mich., assignor, by mesne assignments, to Houdaille-Hershey Corporation, Detroit, Mich., a corporation of Michigan Application December 17, 1937, Serial No. 180,272

3 Claims. (Cl. 293—55)

This invention relates to bumper structures for automobiles, the general object being to provide more desirable and more efficient construction and arrangement.

In the more modern types of automobiles, the radiator at the front of the car is placed comparatively low, and with the ordinary type of bumper, in which the impact bar is comparatively wide and extends substantially in a vertical plane, the air current through the radiator may be obstructed, thus interfering with the proper functioning of the radiator. An important object of the invention is, therefore, to provide an automobile bumper in which the impact bar is constructed and arranged so that it will not obstruct or interfere with the flow of air through the radiator, this being preferably attained by building up the impact bar structure so that its central portion will be of one or more flat bars set edgewise so as to afford the least obstruction to air flow through the radiator.

A further object is to provide for connecting the edgewise bars at their ends directly to the hangers or supporting bars which secure the bumper structure to the automobile chassis, such supports, together with the edgewise setting of the bars, materially strengthening the center portion of the bumper structure against bending, so that greater protection will be afforded for the radiator structure and the grille associated therewith.

A further object is to provide vertically extending bumper guards and improved arrangements for securing them, preferably at the junctures and connections between the edgewise bars and the end portions of the bumper structure and the bumper structure supporting bars or hangers.

A further important object is to provide an arrangement in which one of the edgewise bars may be extended laterally and serve for gravel deflection.

The above enumerated and other features of the invention are incorporated in the structure disclosed on the drawings, in which drawings Figure 1 is a plan view of the bumper structure and the outer end of the supporting bar or hanger structure for securing the bumper structure to a vehicle chassis;

Figure 2 is a front elevation;

Figure 3 is an enlarged section on plane III—III of Figure 2;

Figure 4 is an enlarged section on plane IV—IV of Figure 1;

Figure 5 is an enlarged section on plane V—V of Figure 4;

Figure 6 is a front elevation of part of the bumper structure showing a modified arrangement;

Figure 7 is a plan view of the structure shown in Figure 6; and

Figure 8 is an enlarged section on plane VIII—VIII of Figure 6.

Referring to Figures 1 to 5, the impact element of the bumper structure comprises the outer portions A and the intermediate or central portions B. The end portions A may be of the ordinary construction in the form of bars arranged substantially in a vertical plane and transversely curved and convexed forwardly.

The hanger or supporting structure shown comprises inner and outer bars 10 and 11 adapted to be secured at their inner ends to the vehicle chassis and extending forwardly and having the laterally inwardly and outwardly deflected ends 12 and 13, the impact end portions A being secured to these ends as by means of bolts 14 and 15 respectively.

The inner portion B of the impact element consists of one or more bars arranged edgewise or in substantially horizontal planes, one above the other, two such bars, 16 and 17, being shown. As shown, the upper bar 16 at its ends is deflected downwardly and a distance inwardly to U-shape, the short legs 18 forming seats for the lower bars 17 to which the bars are secured as by bolts 19, or in any other suitable manner. The yoke portions 20 of the U-bends of the upper bar 16 are in alignment with the rearwardly deflected ends 21 of the inwardly deflected outer part 12 of the inner hanger bars 10, and the impact portion B, comprising the upper and lower edgewise bars 16 and 17, may be secured directly to the hanger bar inturned ends 21 as by bolts 22. However I preferably interpose bumper guard structures 23 which, in the arrangement of Figures 1 to 5, are in the form of flat bars or oblong plates interposed between the hanger bar ends 21 and the yoke portions 20 of the U-ends of the bar 16, the guard plates having holes 24 for receiving the bolts 22. As shown by Figure 4, the forward edge of the guard bars may have indentations 25 and 26 for receiving the upper and lower edges of the respective end portions A of the bumper structure, such interconnection serving to rigidly hold the guard bars in vertical position and also strengthening the connection between the portions A and B of the bumper structure. The end portions A overlap the middle portion B a distance so as to cover the connecting structure and make it invisible from the front of the bumper structure.

The middle portion B of the bumper structure, by virtue of the edgewise disposed bars, lends rigidity and strength to the bumper structure for protection of the radiator and associated parts of the vehicle, and furthermore this edgewise arrangement of the bars will not interfere with the free flow of air through the radiator. The end portions A of the bumper structure may function in the ordinary way for protecting the fenders of the vehicle. The guard bars will assist the edgewise bars in protecting the radiator structure and in preventing interlock of bumper bars.

In the arrangement of Figures 6 to 8, the middle section B of the bumper structure comprises upper and lower plain, flat horizontal bars 27 and 28 arranged edgewise, these bars at their respective ends being secured to the upper and lower rearwardly extending legs of U-pieces or fittings 29 as by bolts 36. The inwardly deflected ends 12 of the inner supporting hanger bars 10 terminate in front of the yokes of the U-fittings 29, the yokes and the bars having registering holes for the reception of bolts 30. The end portions A of the bumper structure may be secured to the inwardly deflected ends 12 of the inner hanger bars 10 by separate bolts, but preferably, as shown in Figure 8, the bolts 30 will also extend through holes 31 in the portions A so that the inner ends of the portions A will be secured to the inner hanger bar ends 12 and to the corresponding U-fittings by common bolts 30.

Where guard bars are to be provided for the bumper structure, such bumper guards may also be secured in place by the bolts 30. As shown on Figures 6, 7 and 8, the guard bars 32 are of the type whose body is of V-shaped, transverse cross-section with the side walls having their rear edges recessed as indicated at 33 to seat the guard bars accurately against the front convex face of the bumper bar, in this case against the bumper end parts A. As shown, the guard bar has a cross wall or plate 34 secured therein and provided with a hole 35 for passage therethrough of the bolt 30. The bolt is inserted through the plate hole before the plate is secured to the guard body, the hole being preferably polygonal and the bolt at its head end of corresponding section so that the bolt will be held against rotation. The bolt head will then be within the guard body and when the guard is applied, the bolt will be extended through the bumper part A, the end of the inner hanger bar 10, and the corresponding U-fitting 29, and the bolt nut 30' then applied and tightened for rigidly securing the various parts together as clearly shown in Figure 8.

To provide more secure seating of the guard structure 32 on the bumper part A, and also to improve the appearance, the guards may have laterally extending ears or flanges 37 along the sides of the recesses 33 so as to fit and seat against the convex front face of the corresponding bumper part A, the inner ends of the parts A being rounded off to follow the edges of the inner ears 37 on the guards, as shown in Figure 8, thus presenting a neat appearance.

The bars 27 and 28 of the middle portion B of the bumper may extend laterally outwardly a distance beyond their connections with the inner hanger bars 10, and one of the bars, as for example the lower bar 28, may extend outwardly a further distance at its end so that this bar may function as a gravel deflector, as best shown in Figure 7.

I have shown simple and practical embodiments of the various features of my invention and I do not desire to be limited to the exact construction, arrangement and operation shown or described, as changes and modifications may be made without departing from the scope of the invention.

I claim as my invention:

1. An automobile bumper comprising a horizontally extending impact bar structure comprising end portions and a middle portion, said end portions being in substantially vertical planes, said middle portion comprising comparatively wide upper and lower bars arranged edgewise in horizontal vertically spaced planes, hanger bars adapted to be secured to an automobile body and secured at their forward ends to said impact bar structure end portions, U-fittings secured by their yokes to the forward ends of said hanger bars and having upper and lower legs extending rearwardly, said upper and lower horizontal bars being secured at their ends to the upper and lower legs of said U-fittings respectively.

2. An automobile bumper comprising a horizontally extending impact bar structure comprising end portions and a middle portion, said end portions being in substantially vertical planes, said middle portion comprising comparatively wide upper and lower bars arranged edgewise in horizontal vertically spaced planes, hanger bars adapted to be secured to an automobile body and secured at their forward ends to said impact bar structure end portions, U-fittings secured by their yokes to the forward ends of said hanger bars and having upper and lower legs extending rearwardly, said upper and lower horizontal bars being secured at their ends to the upper and lower legs of said U-fittings respectively, one of said horizontal bars having its ends extended laterally outwardly behind said end portions to serve as gravel deflectors.

3. An automobile bumper comprising a horizontally extending impact bar structure comprising end portions and a middle portion, said end portions being in substantially vertical planes, said middle portion comprising comparatively wide upper and lower flat bars arranged edgewise in horizontal vertically spaced planes, hanger bars adapted at their rear ends for connection with a vehicle body and having their front ends deflected laterally, a U-fitting for each hanger bar, a common means securing the laterally deflected end of each hanger bar to its U-fitting and corresponding end portion of the impact bar structure and with the upper and lower legs at the U-fittings extending rearwardly, said upper and lower horizontal bars being secured at their ends to the upper and lower legs of the respective U-fittings.

HERBERT S. JANDUS.